United States Patent Office 3,378,544
Patented Apr. 16, 1968

3,378,544
PURIFYING ESTERS OF POLYHYDRIC
ALCOHOLS
Charles J. O'Boyle, Gramercy, La., assignor to North American Sugar Industries Incorporated, New York, N.Y., a corporation of New Jersey
No Drawing. Continuation-in-part of application Ser. No. 263,349, Mar. 6, 1963. This application July 13, 1964, Ser. No. 382,394
11 Claims. (Cl. 260—210)

ABSTRACT OF THE DISCLOSURE

A method for removing extraneous solvents from preparations of polyhydric alcohols is disclosed wherein the ester-containing mass is dispersed in a wash solvent in which the extraneous solvent to be removed is soluble, but in which the ester to be purified is of limited solubility. Wash solvents disclosed in this application are aqueous salt solutions of common inorganic salts. Methods for the preparation and partial purification of polyhydric alcohol esters are also described.

---

This application is a continuation-in-part of copending applications Ser. No. 33,116 filed June 1, 1960, now U.S. Patent No. 3,141,012 and Ser. No. 263,349, filed Mar. 6, 1963, now U.S. Patent No. 3,141,013.

This invention relates to a process for refining esters of polyhydric alcohols and in particular it is concerned with a method for removing certain solvents which may be mixed with the esters of polyhydric alcohols as impurities.

The invention provides improvements and procedures for the preparation of the esters of solid polyhydric alcohols by which an ester product containing acceptably small amounts of processing solvents may be obtained.

The esters of solid polyhydric alcohols which are to be purified within the scope of this invention are useful as chemical intermediates and surface-active agents. As chemical intermediates, they are useful in the preparation of synthetic resins, waxes, drying oils, and lubricants. As surface-active agents, they are useful as emulsifiers, solubilizers, dispersing and wetting agents, textile processing assistants, and ingredients in detergents, cosmetics, pharmaceuticals and foods.

Ester compositions of the type sought to be made and purified have found only limited commercial use, in spite of their value in the applications mentioned above, because of difficulties which have been experienced in isolating and refining them after they have been synthesized.

The ester products described above are generally made by a transesterification reaction between a polyhydric alcohol and an ester (for example, a methyl ester or triglyceride fat) as represented by the equation:

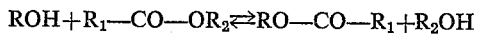

$$ROH + R_1\text{—}CO\text{—}OR_2 \rightleftarrows RO\text{—}CO\text{—}R_1 + R_2OH$$

where R represents the residue of the polyhydric alcohol, $R_1$—CO represents the acyl moiety of the ester reagent, and $R_2$ represents the residue of the alcohol moiety of the ester reagent.

The ester products which are within the scope of this invention are ones which contain substantial amounts of monoesterified polyhydric alcohol. In order to obtain these products it is necessary to use a large amount of polyhydric alcohol in the reaction mixture and to have an excess of unreacted polyhydric alcohol in the reaction mass at the end of the synthesis.

To carry out the reaction effectively one or more solvents are required at various stages of the process. Reaction solvents, also referred to as primary solvents, are required in order to get the reagents in the same phase so that the reaction may proceed at a satisfactory rate. To minimize side reactions in the synthesis of esters, moderate temperatures are generally required. Such moderate temperatures further enhance the need for reaction solvents to dissolve the polyhydric alcohol and ester reagents.

The unreacted polyhydric alcohol remaining after the reaction may be separated from the reaction mass by adding another solvent to the reaction mass, known as a secondary solvent, which selectively precipitates the unreacted polyhydric alcohol. Such a process is disclosed and claimed in my copending application Ser. No. 33,116, filed June 1, 1960, U.S. Patent No. 3,141,012, issued July 14, 1964. The liquor recovered after precipitation is usually distilled to remove most of the secondary or precipitation step, the crude reaction product may be In addition to, or in substitution for, the foregoing precipitation step, the crude reaction product may be processed in other ways, including the purification processes described in United States Patent No. 2,893,990. Such steps may introduce other types of processing solvents.

It is generally desirable to remove as completely as possible the primary and secondary and other processing solvents used in connection with the foregoing procedures, since some of these processing solvents are toxic, or irritating to the eyes and/or skin, and others, even though non-toxic, impart an undesirable odor or flavor to the product.

Furthermore, recovery of the processing solvents is important from an economic standpoint. The solvents required, particularly the reaction solvents, are relatively expensive, and since they add no value to the products, substantially complete solvent recovery is desirable to make the process economically attractive.

As described in my copending U.S. Patent No. 3,141,013 processing solvents of the foregoing description may be removed by distillation of the reaction mass containing the polyhydric alcohol ester in the presence of oxygenated polar solvents which are referred to as "fluxing agents." These oxygenated solvents make it possible to distill the processing solvents to extremely low concentrations, so that their presence will not be objectionable.

However, because the fluxing agents are frequently solvents of relatively low volatility, such as ethylene glycol and glycerine, it may be impractical to remove completely the fluxing agent by distillation. Thus, for instance, a typical polyhydric alcohol ester may be distilled in the presence of a fluxing agent to remove processing solvents and the distillation continued under vacuum until the mass has a temperature of 100°–125° C. at a vacuum of less than 1 mm. Hg pressure. Under these stripping conditions products containing 1% to 10% of the fluxing agents are often obtained. In other cases higher concentrations of fluxing agent, i.e., up to 20% or more may remain in the product. In some applications, concentrations of the fluxing agent of up to 10% or more may be undesirable.

Accordingly, it is an object of this invention to provide a method for reducing the concentration of fluxing agents in polyhydric alcohol ester products.

While this invention contemplates generally the separation of polyhydric alcohol esters and the solvents described in my United States Patent No. 3,141,013 mentioned above, for whatever reasons such agents may be admixed with the ester, it is a particular object of this invention to provide a method of improving the purified ester products which are obtained by practicing the process described and claimed in said United States Patent.

These and other objects are realized by washing a polyhydric alcohol ester containing certain fluxing agents (which are described more particularly below) with a wash solvent which is a substantially neutral solution of certain soluble inorganic salts. Generally, the ratio of the wash solvent to polyhydric alcohol ester will be in the range of about 0.8/1 to 20/1. The ester product is agitated with the wash solvent to thoroughly contact the former with the latter. Thereafter the mixture of ester product and wash solvent is separated into an ester-rich phase and a solvent-rich phase, and at least a portion of the solvent-rich phase is removed.

The success of the present invention depends upon the discovery that the wash solvents are miscible with the solvent impurities to a sufficient degree to extract the solvent impurities while, at the same time, the solvents do not dissolve any substantial amount of the polyhydric alcohol ester product.

More specifically, in the process to which the present invention is applicable, esters of solid polyhydric alcohols are prepared by reacting a solid polyhydric alcohol in a transesterification reaction with an ester of an alcohol and a carboxylic acid under conditions to form esters of the solid polyhydric alcohol with the acid and to release the alcohol. The reaction is carried out in the presence of a primary solvent and an alkaline catalyst for the reaction, and preferably utilizes a large excess of solid polyhydric alcohol to promote formation of a large proportion of monoesterified solid polyhydric alcohol.

Generally, the solid polyhydric alcohols which may be employed in the manufacture of esters applicable to the present invention are the polyhydric aliphatic alcohols that have at least four free hydroxy groups, 4 to 18 carbon atoms, and have a melting point of at least about 85° C. They should also be free of groups which interfere with the transesterification reaction. Specific illustrative alcohols include the non-reducing oligosaccharides such as sucrose and raffinose, pentaerythritol, dipentaerythritol, tripentaerythritol, xylitol, sorbitol, mannitol, the lower alkyl glucosides and acetyl glucosamine, N-urea glucoside and N,N-urea diglucoside. Mixtures of the polyhydric alcohols can also be used. Such mixtures include mixtures of sucrose and raffinose obtained in the refining of beet sugar, mixtures of sorbitol and mannitol which are obtained by reduction of corn sugar and invert sugar and mixtures of the various pentaerythritols which are obtained in the condensation of acetaldehyde and formaldehyde in the presence of alkaline catalysts.

The acid moiety of the polyhydric alcohol ester is derived from reactants which are esters of aliphatic alcohols, glycols and glycerine on the one hand, and mono-, di- and polycarboxylic acids having from about 8 to about 32 carbon atoms on the other hand, the latter being free of groups which interfere with the transesterification reaction and containing no more than two oxygen atoms in addition to those in the carboxyl groups. Many suitable ester reactants are described in my copending U.S. Patent No. 3,141,012. Typical ester reactants include, but are not limited to, tallow and other fats, cottonseed oil, coconut oil, oiticica and castor oils and other vegetable oils, marine oils such as fish and whale, esters of tall oil fatty acids, methyl esters of rosin acids, methyl esters of naphthenic acids derived from petroleum, the ester component of various vegetable waxes such as carnauba and sugar cane wax, ethyl stearate, methyl esters of di- and tri-basic acids which are obtained by polymerization of mixtures of mono-, di- and tri-unsaturated fatty acids, methyl esters of the tri- and poly-basic acids which can be prepared by condensation of methyl esters of maleic and fumaric acids with the methyl esters of oleic, linoleic and other unsaturated fatty acids, ethyl esters of the tallow fatty acids, and mixtures of these esters.

In addition, the ester components may be relatively pure with respect to the acid component, e.g., esters of caprylic, capric, lauric, myristic, palmitic, oleic, oleostearic, arachidic, behenic and lignoceric acids.

A number of primary reaction solvents may be used for the transesterification reaction. Useful primary solvents are described in detail in my above-mentioned United States Patent No. 3,141,012. Four groups are defined. These are briefly summarized as follows:

The first group consists of mono- and di-alkyl and alkoxy-alkyl amides of lower fatty acids, the amides containing from 3 to 8 carbon atoms, The group includes dimethyl formamide, dimethyl acetamide, N-n-amyl N-methyl formamide, N,N-di(methoxyethyl)formamide, N-methyl N-ethoxyethyl formamide, and N-methyl formamide.

The second group consists of amides of lower fatty acids in which the nitrogen forms part of a heterocyclic ring system. This group of primary solvents includes N-formyl morpholine, N-acetyl morpholine, N-propionyl morpholine, dimethyl N-formyl morpholine, N-formyl piperidine and N-acetyl piperidine.

The third group of primary solvents are tertiary amines having one, two or three alkoxy-alkyl radicals, and having less than 9 carbon atoms. Examples include dimethyl methoxyethyl amine, methyl dimethoxyethyl amine, dimethyl ethoxyethyl amine, methyl ethyl methoxyethyl amine, dimethyl 2-methoxypropyl amine, and tri(methoxyethyl)amine.

The fourth group of primary solvents are the N-alkyl pyrrolidones and caprolactams. Examples include N-methyl-2-pyrrolidone, N-butyl pyrrolidone, and N-methyl caprolactam.

Mixtures of the primary reaction solvents described above may also be used.

After the transesterification reaction has terminated, any reaction has terminated, any reaction catalyst present should be deactivated if a product containing a high proportion of monoester is desired. If, as is customary, an alkaline catalyst is employed, the catalyst may be deactivated by the addition of an acid such as those described in my U.S. Patent No. 3,141,013. As an alternative, the reaction mass may be maintained at the reaction temperature for a period of time sufficient to consume the alkaline catalyst by a saponification reaction.

After deactivating the catalyst, the reaction mass is subjected to one or more purification steps. It is these steps which introduce the fluxing agents which the present invention is adapted to remove.

As has already been mentioned, it is particularly contemplated that the fluxing agents will be added as a part of the fluxing process described in my U.S. Patent No. 3,141,013. Thus, as disclosed in that patent, the fluxing agent is incorporated into the crude reaction mass containing some residual primary reaction solvents. The mass, including the fluxing agent, is thereafter subjected to distillation to remove a substantial portion of the residual primary reaction solvent. Generally, distillation is carried out at a temperature below 140° C., and may be carried out under vacuum.

Depending on the volatility of the fluxing agent and the distillation conditions, the product resulting from the fluxing process may contain as little as 1% of the fluxing agent. However, it may not always be convenient or practical to strip the fluxing agent so completely from the ester mass. Some fluxing agents may be too low in volatility to be removed conveniently by distillation. Even if the fluxing solvent is sufficiently volatile that low concentrations would be obtained by distillation, it may be convenient not to do so in order to obtain thereby a relatively fluid product which can be handled more readily than a product which has been substantially freed of the fluxing agent.

The fluxing agent impurities which may be removed successfully by the present invention are one or more solvents selected from the group consisting of:

(a) The aliphatic diols having 2 to 6 carbon atoms, and partial esters of these diols with acetic, propionic and butyric acids in which the number of carbon atoms in the ester does not exceed 6. These materials include ethylene glycol, the propylene glycols, the butane diols, triethylene glycol, di-propylene glycol, 2,2-dimethyl-1,3-butanediol, and esters of ethylene glycol with acetic and propionic acids in which one of the hydroxyls of the diol is esterified.

(b) The aliphatic triols having from 3 to 6 carbon atoms, monoesters of these triols with the lower fatty acids which have from 2 to 4 carbon atoms and containing not more than 8 carbon atoms in the ester molecule, and diesters of glycerine with acetic acid. These materials include glycerine, the butane triols, 1,2,6-hexanetriol, and esters of these compounds with acetic, propionic, butyric or isobutyric acid in which one of the hydroxyl groups of the triol is esterified and in which the ester contains no more than 8 carbons.

(c) Partial esters of aliphatic dicarboxylic acids having from 4 to 6 carbon atoms with the lower alkanols, there being up to 7 carbon atoms in the ester molecule, partial esters of malic acid with the $C_1$–$C_4$ alkanols, and the full ester of malic acid with methanol. Suitable lower monohydric alcohols are those having from 1 to 3 carbon atoms inclusive. Specific examples include the mono esters of methyl, ethyl, or propyl alcohols with the following acids: fumaric, maleic and succinic acids and mono esters of adipic, and itaconic with methyl alcohol and the mono methyl and ethyl esters with malic acid.

(d) Partial esters of methyl and ethyl alcohols with tartaric and citric acids having not more than 9 carbon atoms, and partial esters of methyl and ethyl alcohol with aconitic acid having not more than 8 carbon atoms.

(e) Esters of lactic acid with propyl or isopropyl alcohol; also esters of lactic acid with the aliphatic diols having from 2 to 4 carbon atoms in which only one hydroxyl group of the diol is esterified.

(f) Esters of acetoacetic acid and levulinic acid with the primary and secondary aliphatic monohydric alcohols which have not more than 6 carbon atoms in the ester molecule; also esters with the aliphatic diols having from 2 to 4 carbon atoms in which only one hydroxyl group of the diol is esterified.

In the practice of this invention, it is generally desired that the reaction solvents described above, should be in a low concentration, preferably not exceeding 20% based on the weight of the polyhydric alcohol ester. As has already been mentioned, the success of the present invention depends on employing a wash solvent system which will not dissolve any appreciable quantity of the polyhydric alcohol ester. The presence of significant amounts of reaction solvents may seriously interfere with this objective. Generally, more than about 20% of the reaction solvent will tend to disperse or solubilize the polyhydric alcohol ester. This will make it difficult subsequently to separate the washed ester from the wash solvent.

It should be recognized, however, that it is not absolutely essential in all instances to reduce the level of reaction solvents below the 20% level. For instance, if the wash solvent has a relatively poor solubility for the product ester (i.e., a solvent containing a large amount of salt) or, if the product ester crystallizes easily, larger amounts of unremoved reaction solvent may be tolerated.

As has already been mentioned, a particular object of this invention is to remove the fluxing agents from the polyhydric alcohol ester following the distillation process described in my United States Patent No. 3,141,013. Since that process will normally remove substantially all of the relatively volatile reaction solvents, there would normaly be little need for concern as to the amounts of reaction solvent which may be present. On the other hand, if the ester product is worked up by other methods, which may not necessarily completely remove the reaction solvent, some attention should be given to this problem.

Generally, the ester product should also not contain more than about 50% fluxing agent, based on the weight of the ester product, because large amounts of fluxing agent tend to make the separation of the ester product and wash solvent difficult. If large amounts of wash solvent are employed, and/or low separation temperatures are employed, esters containing up to about 50% fluxing agent, or in some instances possibly more, may be processed satisfactorily. If lower amounts of fluxing agents are used, or higher separation temperatures, it is generally preferred to limit the amount of fluxing agent to about 20%. The factors of separation temperature and ratio of wash solvent to ester product are discussed in more detail below.

Wash solvents which may be employed in the present invention are substantially neutral solutions of inorganic salts. The solution should contain more than about 1% salt, and may contain as much salt as the solution will hold (i.e., up to saturation).

The salts which may be used are basically the soluble salts of the common inorganic acids with the common bases. The resulting solution should be substantially neutral. A solution having a pH of about 6 to 8 is preferred. Illustrative common salts included are the salts of hydrochloric, hydrobromic, sulfuric, phosphoric, pyrophosphoric and nitric acids with sodium, potassium, calcium and magnesium. In the case of the salts of the phosphates, generally a mixture of salts such as monosodium phosphate and disodium phosphate will be necessary to obtain a pH within the desired range.

The salt solution will normally contain between about 1% and 25% salt. Best results are usually obtained with solutions containing at least about 2% salt. Some of the ester products mentioned above are relatively insoluble, such esters being normally characterized by relatively large saturated fatty acid groups. As applied to the purification of such esters, the wash solvent may contain smaller amounts of salt, i.e., 1%–3%. Other esters, however, are relatively more soluble (e.g., esters of the intermediate size fatty acids and esters of unsaturated fatty acids). When applied to such esters, the wash solvent should contain a sufficient amount of salt to insolubilize the ester product.

While the wash solvents of the present invention consist essentially of salt solutions, it should be mentioned that other materials, including oxygenated organic compounds such as ketones, esters and alcohols may also be present. As discussed in my copending application Ser. No. 382,391 filed July 13, 1964 (concurrently herewith) such oxygenated hydrocarbon solvents are themselves also useful as wash solvents. These oxygenated organic solvents are useful for separating the fluxing agents and ester products described above (as well as other fluxing agents and esters as described in my aforementioned copending application).

Accordingly, it will be obvious that the esters and fluxing agents described herein may be separated by mixtures of a wash solvent consisting essentially of an aqueous salt solution as described above or a wash solvent which consists essentially of an oxygenated organic solvent or mixture thereof. Such cases will result in the simultaneous or successive practice of both the invention claimed herein and the invention claimed in my aforesaid copending application. Where the presence of an extraneous solvent, such as another wash solvent, will not have a substantial adverse effect on the relative solubilities of the ester and fluxing agent in the wash solvent of this invention, which consists essentially of the salt solution described above, the phrase "consisting essentially of" as used herein and in the appended claims, contemplates that the invention claimed in this application may be practiced simultaneously with the invention claimed in my aforementioned copending application by the use of a wash solvent consisting essentially of a salt solution admixed with up to 50% or more of a wash solvent consisting essentially of a volatile oxygenated hydrocarbon.

In the broadest aspects of this invention, the ester product containing a fluxing agent is dispersed in the wash solvent. The method or time of adding the wash solvent is not important. However, a number of the fluxing agents and other solvents may be less volatile than water so that water would be removed preferentially if a mass containing such a fluxing agent and a brine wash solvent were distilled. Accordingly, if the polyhydric alcohol ester is worked up by a method including a distillation step, the wash solvent should normally not be added until after distillation has been completed. Thus, for instance, as applied to the purification of the product of the process disclosed and claimed in my United States Patent No. 3,141,013, the wash solvent will be added after the fluxing process has been completed.

Generally, washing may be carried out at any temperature up to about 100° C. (or the boiling point of the brine). Heating of the mass is not required. However, warming of the ester-wash-solvent mass during dispersion may improve the fluidity of the mass, and thereby improve the effectiveness of washing.

Depending on the ester product, the amount of salt in the wash solvent, the relative proportions of ester and wash solvent, and the temperature at which dispersion takes place, complete solution or colloidal dispersion of the ester in the wash solvent may occur. Such a result will lead to particularly effective washing. However, in this event subsequent cooling will be required to separate the washed ester from the wash solvent.

To disperse the ester effectively in the wash solvent it is preferred to agitate the mass. Agitation is continued until the ester product has been thoroughly contacted with the wash solvent. Generally, a substantially uniform mass will be obtained. If the ester product has been prepared by the fluxing process, or by any other process resulting in a relatively dry, solid mass before mixing with the wash solvent, it may be desirable to break up the product so that the largest lumps are not more than about ½ inch in diameter so that the ester will be more readily dispersed. Thereafter, the product is added to the wash solvent and the mixture agitated. Agitation may continue for less than 10 minutes up to more than an hour, although this will vary widely depending upon the initial condition of the mass before the wash solvent has been added, the temperatures of agitation and the equipment used.

After the wash solvent and polyhydric alcohol ester have been thoroughly contacted with each other, the mixture is separated into a solvent-rich phase and a product-rich phase and the solvent-rich phase is removed. The solvent-rich phase may have a density which is less than, equal to, or more than the density of the product-rich phase depending on the concentration of the salt in the wash solvent and other factors.

The product-rich phase is usually in the form of a cake, paste or curd. It will be understood that by referring to a product-rich "phase," I do not mean to imply that the ester is necessarily dissolved or colloidally dispersed in the wash solvent. I refer merely to the fact that the product will separate from the bulk of the wash solvent under the influence of gravitational or like forces into a separate cake, paste, curd or sediment as a solid or semi-solid phase which generally contains some of the wash solvent dispersed therein.

To obtain adequate phase separation, it may be helpful to cool the ester-wash solvent mass. This is discussed more completely below.

Depending on the means of separation, the product-rich phase may range anywhere from a hard, wax-like solid to a soft, relatively fluid pasty mass. In some cases a crystalline or particulate solid may be obtained. One method of separating the solvent from the product is to employ sedimentation, either simple settling or centrifuging. If a particulate solid is obtained, filtration can be used. However, experience has shown that the polyhydric alcohol product commonly has a plastic character which renders filtration an impractical method of separation.

If the salt solution is not highly concentrated, the product-rich phase will generally have a density which is greater than the density of the solvent-rich phase. Accordingly, the product-rich phase will accumulate as a sediment or centrifuge cake if subjected to gravitational or centrifugal forces. More often, where concentrated salt solutions are used, the product-rich phase will have a lower density than the solvent-rich phase, and, will, accordingly, segregate and rise to the surface of the mass as a curd layer. In this event, the product phase may be conveniently recovered by skimming.

Some consideration should be given to the relative densities of the salt solution and the ester product. A salt concentration should be selected which will yield a product-rich phase differing in density from the solvent-rich phase, so that the phases can be separated practically by gravitational or centrifugal force. If the product and solvent phases are of the same or very nearly the same densities, separation either as a sediment or a curd may be impossible and, as noted above, separation by means of filtration is not normally practical.

After the mixture of ester product and wash solvent has separated into two phases, at least a part of the solvent-rich phase is removed. The fluxing agent contained in this phase is subsequently recovered by fractional distillation. Generally, the wash solvent will contain some ester product which is also recoverable. Most simply, this may be done by evaporating the wash-solvent to dryness.

The product-rich phase may contain greater or lesser amounts of wash solvent depending upon the efficiency of the method of separating. he product may be stripped to remove the wash solvent. Stripping of the polyhydric alcohol ester product is preferably carried out in an agitated vessel, such as a Sigma-blade mixer to prevent caking of the product as the solvent is removed. Stripping may be continued until the temperature is in excess of around 100° C., and the vacuum is as low as may be practically obtained with the vacuum equipment available. This will permit the recovery of an ester product containing the highest possible percentages of solids. To avoid degradation of the product, stripping temperature should not normally exceed about 140° C.

It is not necessary, however, that the product be stripped following removal of the solvent phase. It is contemplated, for instance, that mixtures of polyhydric alcohol and wash solvent in the form of a paste may be employed commercially because such materials can be readily handled. In the event that it is contemplated to employ the ester product as a paste, it is obvious that the salt in the wash solvent should be one which is compatible with the subsequent use to be made of the ester product.

Pastes are especially useful in certain applications in the food processing and detergent industries. The substantially dry solid ester products are difficult to disperse in cake batters, bread doughs, mixes used to make frozen desserts such as ice cream and mellorines, and in pastes employed in the manufacture of detergents. The pastes or solutions, on the other hand, are easily dispersed, and are, therefore, especially adapted to the foregoing applications.

As already mentioned, the ratio of wash solvent to ester should be between about 0.8/1 and 20/1. In selecting a suitable ratio, the solubility of the ester product in the wash solvent should be considered. Some of the ester products tend to dissolve in the wash solvent. If relatively soluble esters are treated, to prevent excessive solubilization of the ester product and the concomitant excessively large proportions of ester which would dissolve into the solvent phase, it is normally preferred to avoid high ratios or to use a wash solvent having higher salt concentrations. On the other hand, if the ester is one which has already a very low solubility in the wash solvent, it may be preferred to employ as high a ratio as possible in order to obtain the most effective washing of the fluxing agent remaining in the polyhydric alcohol ester.

The amounts of reaction solvent and fluxing agents present will also affect the solubility of the ester product in the wash solvent. If large quantities of such solvents are present, a larger proportion of wash solvent will be required to obtain a good recovery of the ester product in the product-rich phase, and to obtain a product-rich phase having a reduced content of fluxing agents.

In some cases, i.e., where the fluxing agent has been stripped to a low level, it may be possible to use a ratio of wash solvent to ester of as little as 0.8/1. Such ratios, however, tend to result in relatively heavy masses of wash solvent and ester. This renders mixing of the mixture more difficult. It is preferred to use a wash solvent to ester product ratio between about 1.5/1 and 5/1. This will normally result in the most advantageous balancing of the factors discussed above.

While the washing step, itself, may be carried out at any convenient temperature, it is preferred that the mass not be excessively warm when the separation is made. To this end, the wash solvent-ester mass may be chilled before separation to a temperature below around 30° C. For maximum recovery, lower temperatures are usually preferred. However, where concentrated brines are used as wash solvents, separation temperature may vary considerably.

As mentioned, if the ester product contains a large amount of fluxing agent it will be particularly important to use lower separation temperatures for optimum efficiency. This is also particularly important if smaller ratios of wash solvent to ester are used.

The washing process of the present invention may be conveniently carried out batch-wise. However, it will be recognized that this invention is not so limited. Thus, for instance, continuous washing equipment may be provided. More importantly, the wash may also be carried out as a countercurrent extraction such as in staged equipment. While the use of a staged countercurrent process will necessarily require the use of more complex and expensive equipment than would a simple batch-wise process, it is possible to obtain much more efficient separation in this manner. If it is necessary to use a low ratio of wash solvent to ester, i.e., in the order of 1/1 to 1.5/1, the use of a staged countercurrent process may be particularly desirable in order to obtain the best possible separation of fluxing agent and ester product.

For a better understanding of this invention, reference may be had to the following examples.

EXAMPLE 1

A sucrose monostearate was prepared in accordance with the process described generally in my U.S. Patent No. 3,141,012. After the transesterification reaction had been completed, the mass was neutralized by the addition of citric acid and unreacted sucrose was precipitated by the addition of a secondary solvent. The mother liquor recovered containing dissolved sucrose monostearate was evaporated to substantial dryness.

Thereafter propylene glycol was added as a fluxing agent and stripping was continued under vacuum until a final stripping temperature of 110° C. was reached at a pressure of 9 mm. Hg. The vacuum was released and the stripped ester product was cooled to below about 100° C. To facilitate removal of the sucrose ester product, about 220 lbs. salt solution (22% NaCl) were added while the product was in the stripping pot. The mixture was kneaded until a pasty mass was obtained. This mass was removed from the stripping pot and transferred to a larger kettle for purposes of washing.

530 lbs. of paste were obtained. The paste was approximately 46% sucrose stearate ester, 9% propylene glycol and 45% salt solution. Less than 0.1% dimethyl formamide was present.

This paste was added to a washing kettle containing approximately 760 lbs. of 22% NaCl solution. The mass was agitated at about 35° to 37° C. until a substantially uniform dispersion was obtained.

Thereafter, the entire mass was cooled to approximately 20° C. and pumped to a cream separating centrifuge which skimmed off the product as a paste which weighed 410 lbs. and had a sucrose stearate content of 51% and contained 0.012% dimethyl formamide and about 2% propylene glycol.

In addition to a reduced content of propylene glycol, the ester product had a reduced content of unreacted sugars and an improved color. Reduction in free sugars and improvement in color are important advantages accruing from the practice of this invention.

The ester product containing 51% sucrose monostearate may be employed commercially as a paste without further processing. The recovered product contained approximately 209 lbs. of sucrose stearate esters on a dry basis, compared with approximately 244 lbs. of sucrose stearate esters in the original paste. The loss of 35 lbs. of stearate esters may be compared with approximately 70 lbs. of stearate ester which have been lost had substantially pure water been employed as the wash solvent.

The following table illustrates further examples of the manner in which the process may be carried out. Specified in the table are the ester product treated, the fluxing agent impurity which was removed, and the ratio of wash water to ester. In each of these examples the procedure generally outlined in Example 1 may be conveniently employed.

| Example No. | Ester Product [1] | Fluxing Agent | Brine | Ratio of Brine to Ester | Separation Temperature, °C. |
|---|---|---|---|---|---|
| 2 | Mannitol caprylate | Glycerine | 25% NaCl | 4/1 | 0 |
| 3 | Sorbitol behenate | Monoethyl succinate | 2% Na$_2$SO$_4$ | 3/1 | 25 |
| 4 | Sucrose oleate | Propylene glycol monolaceate | 20% NaCl | 3/1 | 10 |
| 5 | Naphthenic acid ester of α-methyl glucoside [2] | Ethylene glycol | 20% CaCl$_2$ | 4/1 | 5 |
| 6 | Naphthenic acid ester of sucrose [3] | do | 22% NaCl | 5/1 | 10 |
| 7 | Sucrose ester of rape-seed oil acids | Methyl levulinate | 20% NaCl | 1.5/1 | 0 |
| 8 | Raffinose stearate | Glyceryl monoacetate | 25% NaCl | 4/1 | 5 |

[1] The product ester content of these preparations is more than 50% by weight monoesterified polyhydric alcohol, but substantial amounts of di- and polyesterified polyhydric alcohol esters may be present.
[2] Made from a commercial naphthenic acid having an average molecular weight of 206.
[3] Made from a commercial naphthenic acid having n average molecular weight of 415.

Although the invention has been described with reference to specific materials and procedures, it will be recognized that many modifications thereof are included within the scope of the appended claims, and that this invention is not limited to the specific compounds mentioned in the foregoing specification.

I claim:
1. In a process for refining polyhydric alcohol esters of solid polyhydric, aliphatic alcohols and carboxy acids, said esters having been synthesized by a transesterification reaction between said polyhydric alcohol and an ester reactant, said polyhydric alcohol containing from 4 to 18 carbon atoms, at least 4 hydroxy groups and having a melting point of at least about 85° C. and the acid moiety of said ester reactant containing from about 8 to about 32 carbon atoms, being free of groups which would interfere with the transesterification reaction, and containing no more than 2 oxygen atoms in addition to those in the carboxy group, said ester being admixed with not more than about 20% of a reaction solvent based on the weight of said polyhydric alcohol ester and up to about 50% based on the weight of said polyhydric alcohol ester of at least one fluxing agent selected from the group consisting of oxygenated polar organic solvents consisting of:
  (a) aliphatic diols having from 2 to 6 carbon atoms and partial esters of these diols with acetic, propionic and butyric acids, the esters having not more than 6 carbon atoms,
  (b) aliphatic triols having 3 to 6 carbon atoms, monoesters thereof with lower fatty acids having from 2 to 4 carbon atoms, the monoester containing not more than 8 carbon atoms, and diesters of glycerine with acetic acid,
  (c) partial esters of aliphatic di-carboxylic acids having from 4 to 6 carbon atoms with the lower alkanols, there being up to 7 carbon atoms in the ester, partial esters of malic acid with lower monohydric primary and secondary alkanols having from 1 to 4 carbon atoms, and the full ester of malic acid with methanol,
  (d) partial esters of methyl and ethyl alcohols with an acid selected from the group consisting of tartaric and citric acid and containing not more than 9 carbon atoms, and partial esters of methyl and ethyl alcohol with aconitic acid having no more than 8 carbon atoms,
  (e) esters of lactic acid with a propanol and esters of lactic acid with the aliphatic diols having from 2 to 4 carbon atoms in which only one hydroxy group is esterified, and
  (f) esters of acetoacetic acid and levulinic acid with the primary and secondary alkanols having up to 6 carbon atoms in the ester molecule and the aliphatic diols having from 2 to 4 carbon atoms in which only one hydroxy group of the diol is esterified,
the improvement comprising dispersing said polyhydric alcohol ester with an amount of a wash solvent between about 0.8 and 20 times the weight of the polyhydric alcohol ester, said wash solvent consisting essentially of a substantially neutral aqueous solution of at least one soluble salt of a metal selected from the group consisting of sodium, potassium, calcium and magnesium and an acid selected from the group consisting of hydrochloric, hydrobromic, sulfuric nitric phosphoric and pyrophosphoric acid, thoroughly to contact the polyhydric alcohol ester with the wash solvent, and to obtain thereby a washed mass, separating said washed mass into a solvent-rich phase comprising said fluxing agent and said wash solvent, and a product-rich phase removing at least a portion of said solvent-rich phase from the washed mass, and recovering said washed mass containing a purified polyhydric alcohol ester.

2. A process according to claim 1 wherein the ratio of wash solvent to polyhydric alcohol is between about 1.5/1 and 5/1 based on the weight of the polyhydric alcohol ester.

3. A process according to claim 1 wherein said oxygenated polar organic solvent is propylene glycol and said polyhydric alcohol ester is sucrose monostearate.

4. A process according to claim 1 wherein said polyhydric alcohol ester is mannitol caprylate and said oxygenated polar organic solvent is glycerine.

5. A process according to claim 1 wherein said polyhydric alcohol ester is sorbitol behenate and said oxygenated polar organic solvent is monoethyl succinate.

6. A process according to claim 1 wherein said polyhydric alcohol ester is sucrose oleate and said oxygenated polar organic solvent is propylene glycol monolactate.

7. A process according to claim 1 wherein said polyhydric alcohol ester is the naphthenic acid ester of alpha methyl glucoside and said oxygenated polar organic solvent is ethylene glycol.

8. A process according to claim 1 wherein said polyhydric alcohol ester is the naphthenic acid ester of sucrose and said oxygenated polar organic solvent is ethylene glycol.

9. A process according to claim 1 wherein said polyhydric alcohol ester is the sucrose ester of rape-seed oil acid, and said oxygenated polar organic solvent is methyl levulinate.

10. A process according to claim 1 wherein said polyhydric alcohol ester is raffinose stearate and said oxygenated polar organic solvent is glycerol monoacetate.

11. A process according to claim 1 wherein the oxygenated polar solvent is present in an amount not exceeding about 10 percent by weight, based on the weight of the polyhydric alcohol ester, the wash solvent consists essentially of an aqueous solution containing between about 2 and about 25 percent by weight of a salt selected from the group consisting of sodium sulphate and sodium chloride, and wherein the washed mass is separated into a solvent-rich phase and a product-rich phase at a temperature which does not exceed about 30° C.

References Cited
UNITED STATES PATENTS

| | | | |
|---|---|---|---|
| 2,800,493 | 7/1957 | Stein et al. | 260—428.5 |
| 2,857,378 | 10/1958 | Hales et al. | 260—234 |
| 2,948,717 | 8/1960 | Babayon et al. | 260—234 |
| 3,219,484 | 11/1965 | Smythe et al. | 260—234 |
| 2,891,089 | 6/1959 | Jolly | 260—468 X |
| 2,911,433 | 11/1959 | Jolly | 260—468 X |
| 3,064,022 | 11/1962 | Jolly | 260—514 X |

LEWIS GOTTS, *Primary Examiner.*

J. R. BROWN, *Assistant Examiner.*

UNITED STATES PATENT OFFICE
CERTIFICATE OF CORRECTION

Patent No. 3,378,544                                  April 16, 1968

Charles J. O'Boyle

It is certified that error appears in the above identified patent and that said Letters Patent are hereby corrected as shown below:

Column 2, line 17, "precipitation step, the crude reaction product may be" should read -- precipitating solven from the crude product. --. Column 3, line 72, "components" should read -- component --. Column 4, line 33, cancel "any reaction has terminated,". Column 8, line 34, "he" should read -- The --.

Signed and sealed this 19th day of August 1969.

(SEAL)
Attest:

Edward M. Fletcher, Jr.                        WILLIAM E. SCHUYLER, JR
Attesting Officer                                 Commissioner of Patents